United States Patent [19]

Puech et al.

[11] 4,427,260
[45] Jan. 24, 1984

[54] NON-LINEAR OPTICAL DEVICE WITH A COMPOSITE WAVEGUIDE AND RADIATION SOURCE USING SUCH A DEVICE

[75] Inventors: Claude Puech; Michel Papuchon, both of Paris, France

[73] Assignee: Thomson-CSF, Paris, France

[21] Appl. No.: 212,276

[22] Filed: Dec. 3, 1980

[30] Foreign Application Priority Data

Dec. 14, 1979 [FR] France ............... 79 30720

[51] Int. Cl.³ ............................................ G02B 5/174
[52] U.S. Cl. .................................. 350/96.14; 307/427; 307/430
[58] Field of Search ............... 350/96.12, 96.13, 96.14; 372/43, 44, 50; 307/427, 430

[56] References Cited

U.S. PATENT DOCUMENTS

| 3,407,309 | 10/1968 | Miller | 307/427 |
| 3,586,872 | 6/1971 | Tien | 307/430 |
| 3,822,927 | 7/1974 | Zernike | 350/96.12 |
| 3,856,379 | 12/1974 | Burns et al. | 350/96.13 |
| 4,236,785 | 12/1980 | Papuchon et al. | 350/96.14 |

FOREIGN PATENT DOCUMENTS

| 2193990 | 2/1974 | France . | |
| 1559128 | 1/1980 | United Kingdom | 350/96.14 |

OTHER PUBLICATIONS

Burns et al., "Observation of Non-Critically Phase-Matched Second-Harmonic Generation in ...," *A.P.L.*, vol. 24, No. 5, Mar. 1974, pp. 222–224.
Ito et al., "Phase-Matched Guided, Optical Second-Harmonic Generation in ...," *Optics Commun.*, vol. 15, No. 1, Sep. 1975, pp. 104–107.
Zernike, "Second Harmonic Generation in Composite Waveguides," *Digest of Topical Mtg. on Integrated Optics*, Salt Lake City, Jan. 1976, pp. WA3-1 to WA3-3.
Uesugi et al., "Efficient Second-Harmonic Generation in Three-Dimensional LiNbO₃ ...," *A.P.L.*, vol. 29, No. 9, Nov. 1976, pp. 572–574.
Sohler et al., "Second-Harmonic Generation in Ti-Diffused LiNbO₃ Optical Waveguides with ...," *A.P.L.*, vol. 33, No. 6, Sep. 1978, pp. 518–520.
Uesugi et al., "Electric Field Tuning of Second-Harmonic Generation in ...," *A.P.L.*, vol. 34, No. 1, Jan. 1979, pp. 60–62.

*Primary Examiner*—John D. Lee
*Attorney, Agent, or Firm*—Cushman, Darby & Cushman

[57] ABSTRACT

Non-linear optical devices incorporating an integrated waveguide on a substrate, also relating to a non-linear optical device utilizing a passive layer covering the integrated waveguide making it possible by increasing the effective index ranges of the fundamental and harmonic radiations to obtain a phase matching for two propagated modes having an increased overlap integral value. The invention is more particularly applicable to frequency doubling making it possible to obtain a visible radiation source from a primary source functioning in the very-near infrared region.

9 Claims, 4 Drawing Figures

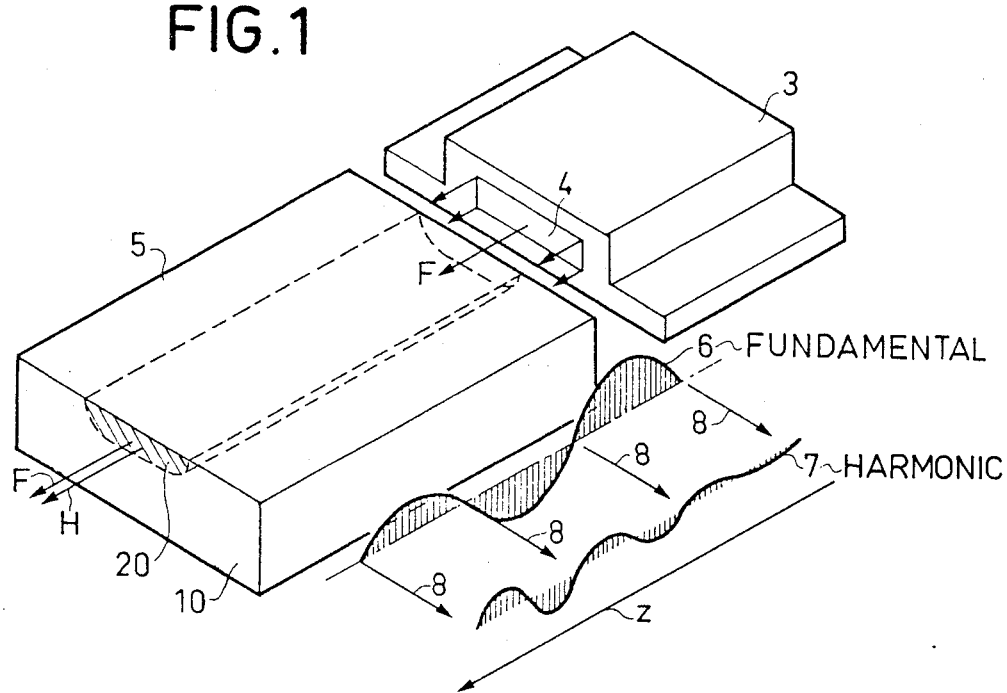
FIG.1
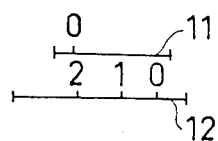
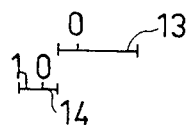
FIG.2

NON-LINEAR OPTICAL DEVICE WITH A COMPOSITE WAVEGUIDE AND RADIATION SOURCE USING SUCH A DEVICE

BACKGROUND OF THE INVENTION

The present invention relates to optical devices making it possible to produce in a non-linear propagation material a radiation, whose wavelength is a sub-multiple of a wavelength of another radiation applied to said material. It more specifically relates to integrated structures in which the two radiations interact in non-linear manner in phase matching within a waveguide obtained by the diffusion of metal ions from the surface of a substrate.

It is known to produce integrated waveguides partly making it possible to convert a fundamental wave into a harmonic wave by the diffusion of titanium into lithium niobate. However, the conversion efficiency of such a structure is low. Thus, the confinement and considerable interaction length of the waves are not the only factors to be taken into consideration when seeking an adequate conversion efficiency. The necessity of satisfying the phase matching condition implies a choice of propagation modes for which there is a low overlap integral value.

In order to solve the problem posed by the choice of modes able to offer a suitable overlap integral value it has been proposed to cover a waveguide with zinc zulphide by means of a titanium dioxide layer. However, this method cannot be used on guides obtained by the diffusion of titanium into lithium niobate because the modes providing the phase matching have a limited overlap integral. Thus, phase matching can be obtained between the zero mode of the fundamental wave and higher order modes of the harmonic wave. If the effective indices of the two first harmonic modes are higher than the effective index of the fundamental mode the addition of a passive layer to the guidance structure leads to an increase in the effective indices, and as a result the first phase matching occurs for a higher rank harmonic mode than that which can be used in the absence of said passive layer.

BRIEF SUMMARY OF THE INVENTION

In order to obviate the disadvantages referred to hereinbefore the invention proposes the use of the passive layer method to a guidance structure for which the effective index range of the fundamental wave is higher than that of the harmonic wave. This method is based on a guidance structure which does not make it possible to directly obtain phase matching through lack of an overlap between the effective index ranges.

The invention therefore relates to a non-linear optical device for producing harmonic radiation from an instant fundamental radiation, said radiations being confined in a waveguide obtained by diffusing a metal ion from the surface of a lithium niobate substrate, wherein phase matching is obtained by coating the free face of the wave guide with at least one passive layer making the effective indices of a fundamental propagation mode and a harmonic propagation mode coincide offering an overlap integral value exceeding that obtainable in the absence of said passive layer.

BRIEF DESCRIPTION OF THE DRAWINGS

The invention is described in greater detail hereinafter relative to non-limitative embodiments and with reference to the attached drawings, wherein show:

FIG. 1 an isometric view of a non-linear device associated with a monochromatic radiation source.

FIG. 2 an explanatory diagram.

DETAILED DESCRIPTION OF THE PREFERRED EMBODIMENTS

Figure 3:
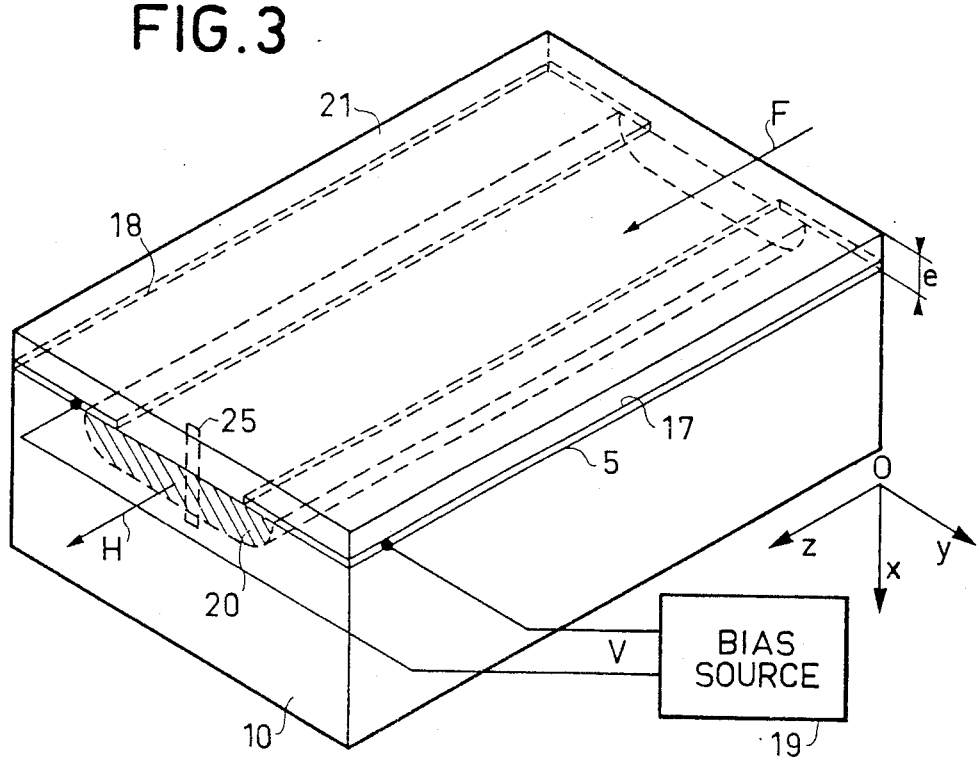
FIG. 3 an isometric view of a non-linear optical device according to the invention.

FIG. 1 shows a radiation source 3, whose output slot 4 emits monochromatic radiation propagated parallel to axis z. This radiation is received by a non-linear optical device, whose structure incorporates a substrate 10 on whose surface 5 is defined a guidance channel 20 by diffusion of a metal ion. The substrate 10 is formed from an optically non-linear material such as lithium niobate. The diffused metal ion is chosen in such a way that the refractive index n in the diffused area 20 exceeds the refractive index $n_s$ of the substrate. A diffusion of titanium or nickel can be envisaged for this purpose. The diffused area is completely surrounded by less refringent zones and constitutes an integrated waveguide. This guide ensures a good confinement of the radiation and when phase matching is obtained, it makes it possible to easily obtain a long non-linear interaction distance. In FIG. 1 the transverse dimensions of the guide are obviously greatly exaggerated.

In order to illustrate the interaction process FIG. 1 diagrammatically shows the amplitude distribution 6 at time t of a fundamental wave F of wavelength $\lambda_F$. The energy of this wave comes from source 3 and as it advances in direction z, the latter gives off part of its energy to a harmonic wave H of wavelength $\lambda_H = \lambda_F/k$, in which k is an integer exceeding unity.

The harmonic wave H is formed in the waveguide 20 as a result of the non-linear interaction occurring therein. It is diagrammatically indicated in FIG. 1 by the amplitude distribution 7. The arrows 8 indicate the energy transfer from the fundamental wave to the harmonic wave. They show the phase matching which assume that the effective refractive indices of the two waves are equal within the guide 20 for propagation direction z.

Each of the two waves can have a number of propagation modes to which correspond separate values of the effective index n. Segments 11 to 16 indicating the ranges in which the respective indices of the fundamental and harmonic waves can be located are plotted in FIG. 2 against a horizontal scale giving the value of the effective index n. The values assumed by the index for different propagation modes are marked by lines designated by the numbers 0, 1, 2 etc. representing the rank r of the propagated mode.

The index ranges 11 and 12 relate to a wave guide obtained by titanium diffusion in a lithium niobate substrate. Range 11 relates to the fundamental mode and range 12 to the harmonic mode produced by non-linear interaction. It can be seen that phase matching is ensured for order 0 of the fundamental wave mode (ordinary wave) and for order 2 of the harmonic wave mode (extraordinary wave). This conventional solution has the disadvantage that the overlap integral value of modes 0 and 2 providing phase matching is low. If x is a direction perpendicular to the surface of the substrate oriented towards the inside (cf. FIG. 3) the electric field form of the fundamental wave can be expressed by $E_r^\omega(x)$ and that of the harmonic wave by $E_r^{k\omega}(x)$, in which k is the rank of the harmonic, r the rank of the propagated mode and $\omega$ the optical pulsation of the fundamental wave. In the case of frequency doubling the overlap integral is given by the relation:

$$\int_{-}^{+} d_{NL}(x) \cdot [E_r^\omega(x)]^2 \cdot E_r^{2\omega}(x)dx \quad (1)$$

in which $d_{NL}$ is the appropriate element of the non-linearity tensor.

To obtain a high value for the overlap integral it is necessary to select a good mode form for the harmonic wave having an extension along x comparable to that of the fundamental wave form.

Index ranges 13 and 14 relate to a waveguide obtained by the diffusion of nickel in lithium niobate.

It can be seen that the range 13 of the fundamental wave has no overlap zone with range 14 of the harmonic wave. Thus, a priori no phase matching can be obtained. Index ranges 15 and 16 of FIG. 2 relate to a composite waveguide according to the invention. This guide is produced from a lithium niobate substrate in which nickel is diffused and whose surface is coated with a passive niobium oxide layer $Nb_2O_5$ of suitable thickness.

The index range 15 of the fundamental wave is only slightly modified with respect to range 13, which relates to the same guide without the passive layer. However, index range 16 relating to the harmonic wave is considerably extended to the right. It is clear that it is possible to obtain phase matching between the mode of order 0 of the fundamental wave and e.g. the mode of order 1 of the harmonic wave. This phase matching makes it possible to obtain a significantly higher value for the overlap integral.

FIG. 3 shows a non-linear optical device according to the invention. In order not to overload the drawing the fundamental radiation source which is, for example, a semiconducting laser emitting in the very-near infrared region is not shown.

Non-linear interaction is confined in waveguide 20 obtained by diffusing nickel from the upper face 5 of the lithium niobate substrate 10. A passive niobium oxide layer 21 covers guide 20 and can extend on either side up to the edge of substrate 10. The passive layer 21 is transparent to the wavelengths of the fundamental radiation F and harmonic radiation H. It must have a high refractive index, so that the electromagnetic energy circulating in guide 20 is conveniently coupled thereto. The thickness e of passive layer 21 is chosen so as to obtain the desired phase matching.

As a non-limitative example and with reference to vacuum for a wavelength of the fundamental wave $\lambda_F = 1$ μm and for a wavelength of the harmonic wave $\lambda_H = 0.5$ μm, it is possible to adapt a profile of the index of the guide diffused in the lithium niobate given by the following expression:

$$n(x) = n_s + \Delta n e^{-\frac{x^2}{a^2}}$$

with $a = 3$ μm, $n_s$ the lithium niobate index and $\Delta n$ the surface variation of the index.

By adopting a passive layer 21 of thickness $e = 0.5$ μm made from niobium oxide, $Nb_2O_5$, it is possible to obtain a 10% conversion efficiency with a 5 μm wide and 1 cm long guide. Thus, in combination with the device described hereinbefore an infrared source with a power of 20 mW can supply a converted power of 2 mW in the visible spectrum. Phase matching control is dependent on the thickness e given to layer 21. In order to make this matching easier, the invention provides the device of FIG. 3 with electrodes 17 and 18 surrounding guide 20. These electrodes are, for example, deposited on the surface 5 of substrate 10 prior to the deposition there of passive layer 21. By connecting electrodes 17 and 18 to a generator 19 of regulatable voltages V, it is possible to use the electo-optical properties of lithium niobate to perfect the phase matching. This voltage can also be used for destroying phase matching in order to modulate the luminous energy supplied by the non-linear conversion.

Figure 4:
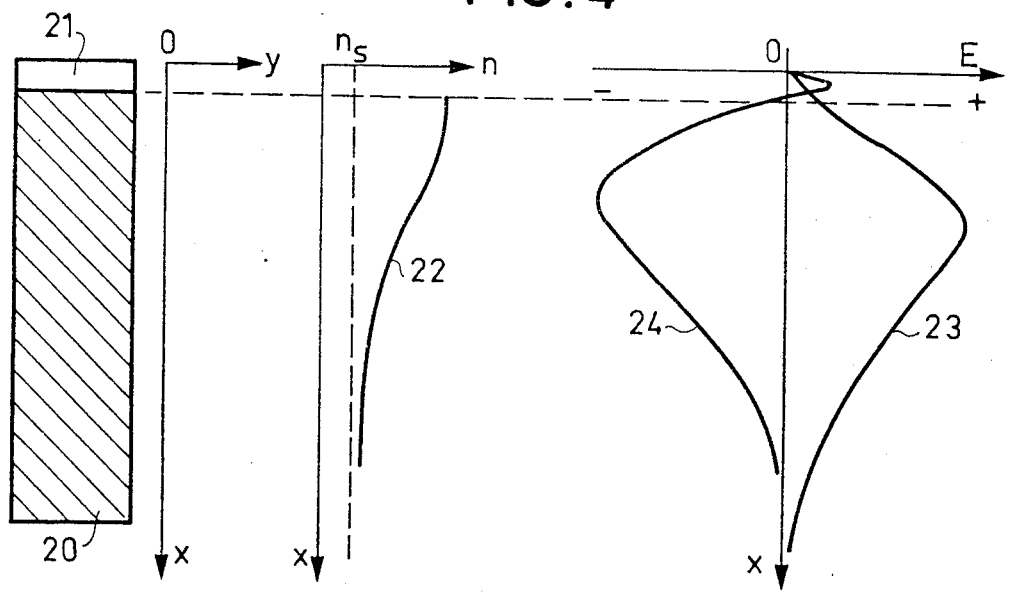
FIG. 4 an explanatory drawing.

FIG. 4 shows a section 25 of the composite guide of FIG. 3 with the profile of index n as a function of the depth x beneath the substrate surface and the distribution profiles of electrical field E. Curve 22 gives the index profile and curve 23 the profile of the mode of order 0 of the fundamental radiation and curve 24 the profile of the mode of order 1 of the harmonic radiation. The overlap integral calculated on the basis of the mode profiles 23 and 24 supplies a high value advantageous for a good conversion efficiency.

The embodiment described makes it possible to double the frequency of the incident radiation. However, it is also possible to extend the scope of the radiation to a higher order frequency multiplication or to the creation of parametric effects. Although the invention has been described and represented with regard to preferred embodiments, it obviously does not pass beyond the scope of the invention to use variants thereof or equivalent means. In particular the passive layer can be of a single or composite nature and can be made from materials other than $Nb_2O_5$, e.g. $TiO_2$. The non-linear interaction also makes is possible to envisage the generation of radiation which is a modulation product of two incident radiations.

What is claimed is:

1. A non-linear optical device for producing harmonic radiation from an instant fundamental radiation, said radiations being confined in a waveguide obtained by diffusing a metal ion from the surface of a lithium niobate substrate, wherein phase matching is obtained by coating the free face of the waveguide with at least one passive layer making the effective indices of a fundamental propagation mode and a harmonic propagation mode coincide offering an overlap integral value exceeding that obtainable in the absence of said passive layer.

2. A device according to claim 1, wherein electrical means for adjusting the phase matching are provided.

3. A device according to claim 2, wherein the electrical means comprise a control voltage source connected to two electrodes surrounding the waveguide.

4. A device according to claim 1, wherein the metal ion is nickel.

5. A device according to claim 4, wherein the passive layer is made from niobium oxide.

6. A radiation source incorporating a non-linear optical device according to any of the preceding claims, wherein the fundamental radiation is produced by a monochromatic radiation source, whose frequency is linked by non-linear interaction to that of the harmonic radiation supplied.

7. A source according to claim 6, wherein the monochromatic radiation source is a semiconducting laser emitting in the infrared region.

8. A source according to claim 7, wherein the harmonic radiation supply is visible radiation.

9. A source according to claim 6, wherein a second fundamental radiation produced by another source is applied to the waveguide.

* * * * *